United States Patent

Pedersen

[11] Patent Number: 6,052,836
[45] Date of Patent: Apr. 25, 2000

[54] ELECTRIC TOILET

[75] Inventor: Thor Pedersen, Gol, Norway

[73] Assignee: Sirus Technology AS, Midsund, Norway

[21] Appl. No.: 09/214,517
[22] PCT Filed: Jul. 10, 1997
[86] PCT No.: PCT/SE97/01252
  § 371 Date: Jan. 21, 1999
  § 102(e) Date: Jan. 21, 1999
[87] PCT Pub. No.: WO98/02079
  PCT Pub. Date: Jan. 22, 1998

[30]    Foreign Application Priority Data

Jul. 12, 1996 [SE] Sweden ............................ 9602780

[51] Int. Cl.[7] .......................................... A47K 11/02
[52] U.S. Cl. .................... 4/111.5; 4/111.3; 4/111.1
[58] Field of Search ........................ 4/111.1–111.6

[56]        References Cited

U.S. PATENT DOCUMENTS 3,227,114  1/1966  Anderson .................. 4/111.3
3,436,765  4/1969  Sundberg ................... 4/111.5
3,816,857  6/1974  West, Jr. ................... 4/111.3
4,425,671  1/1984  Nelken ..................... 4/111.5
5,337,422  8/1994  Blankenship ............... 4/111.5
5,357,880  10/1994 Kishi ....................... 4/111.1

*Primary Examiner*—Steven O. Douglas
*Assistant Examiner*—Tuan Nguyen
*Attorney, Agent, or Firm*—Griffin, Butler, Whisenhunt & Szipl, LLP

[57]         ABSTRACT

An electric toilet comprising a cabinet or housing (10), an opening (16) in the top side of the cabinet, a lid (14) assigned to the opening (14), an upper bowl (18) arranged inside the opening, which bowl is openable downwards, a combustion chamber (32) arranged beneath the upper bowl (18) with a combustion space (34) and provided with an opening (36) directed upwards, assigned to which opening is a lid (38), heating coils (44) arranged in the combustion space (34) and an evacuation device (48, 50, 52) connected to the combustion space (34). The invention is characterized in that at least the combustion space's (34) lower part is formed principally spherically and that the heating coils (44) are arranged in the upper part of the combustion space round its circumference.

12 Claims, 3 Drawing Sheets

ELECTRIC TOILET

TECHNICAL FIELD

The present invention relates to an electric toilet comprising a cabinet or housing, an opening in the cabinet's top side, a lid assigned to the opening, a bowl arranged inside the opening, which bowl is openable downwards, a combustion chamber arranged under the upper bowl and provided with an opening directed upwards, arranged to which opening is a lid, heating coils arranged in the combustion chamber and an evacuation device connected to the combustion chamber.

BACKGROUND TO THE INVENTION

The most common form of toilets without a doubt are water toilets. For reasons which are self-evident, these cannot be used for certain application areas and in certain places, for example holiday cottages and boats. Other types of toilets have been developed for these, such as earth closets, freezer toilets and electric toilets, for example. Recently these types of toilets have also come into fashion on account of environmental aspects. Many places and urban districts do not permit water toilets to be connected up to the sewerage system on account of treatment plant capacity and groundwater resources. Of the alternative toilets, electric toilets offer the absolute minimum of waste products.

Electric toilets function so that they are arranged with a receptacle under a protective lid, into which receptacle a liquid-resistant paper bag is placed. When one has relieved oneself into this and "flushes", i.e. activates the device by stepping on a pedal for example, the receptacle is opened and the waste drops down into a combustion chamber placed under the receptacle. When the pedal is then released, the receptacle and a lid for the combustion chamber are closed. Heating coils are then activated in the combustion chamber, which burns the waste. An evacuation facility from the combustion chamber arranged with a fan sucks out the combustion gases and routes them out into a ventilation pipe. Following combustion, only a little ash remains in the bottom of the combustion chamber.

The electric toilets which are on the market have a number of disadvantages. Due to the fact that the combustion chamber is designed as a vertical cylinder and the electric coils are arranged in the top edge of the cylinder up by the lid, the coils do not provide uniform radiant heat in the bottom of the combustion chamber, but "pockets" are obtained with poorer heat, especially around the edges between the bottom and the side. Other disadvantages are that the top part of the bag has a tendency to get caught between the lid and the edge of the combustion chamber, in which case the bag does not collapse when it drops down but stands up. This also applies if the foot slips off the pedal during "flushing". If combustion is then commenced, the combustion chamber is not closed, but flames may emerge between the lid and the opening.

Another serious disadvantage is the design of the evacuation device. If the power for the electric toilet is lost while combustion is in progress, the power for the suction fan is also lost. This means that the flue gases from the hot feces are no longer sucked out but end up in the space where the toilet is located, with a powerful stench as a result. Furthermore, a nasty-smelling coating is obtained on the fan, especially when this is arranged in the path of the flue gases.

From the safety aspect, the electric toilets on the market are not optimun, as they permit flushing to occur when the protective lid is raised. This causes children for example possibly to get the idea into their head of stepping on the pedal with the protective lid open, in the event of which the receptacle and the combustion chamber are opened, with a major risk of burns. In addition, these electric toilets are disposed with a spring system for suspension of the upper and lower part of the combustion chamber, which springs lose their elasticity with time on account of the heat and even break, which on the one hand causes a gap between the parts of the combustion chamber and on the other means that the toilet cannot be used.

A further disadvantage is that the electric toilets on the market do not have any spillage protection in case a person does not know how the toilet is to be used and urinates in the receptacle without having first placed a bag therein. The urine then runs down through the receptacle and into the interior of the toilet with major cleaning problems as a result.

Further disadvantages are that the locking of the ash box, i.e. the lower part of the combustion chamber, includes springs which draw this up towards the upper part of the combustion chamber. These lose their elasticity after a relatively short time, largely due to the heat from the combustion, at which a gap is created between the ash box and the upper part with a strong odor as a result.

DESCRIPTION OF THE INVENTION

The object of the device according to the invention is to remedy the above problem complex and disadvantages of conventional electric toilets. This is achieved according to an aspect of the invention by an electric toilet characterised in that the combustion space of the combustion chamber is shaped principally spherically and that the heating coils are arranged in the upper part of the combustion space around its circumference.

According to an aspect of the invention, it is characterised in that the bottom of the combustion space is arranged with a turning device directed upwards.

According to another aspect of the invention, it is characterised in that the evacuation device is arranged with a fan and that the fan is driven by low direct-current voltage.

The electric toilet according to the invention displays a number of advantages compared with conventional electric toilets. Thanks to the fact that the combustion space is shaped principally spherically and that the heating coils are arranged in the upper part of the combustion space, directed heat radiation down towards the bottom of the combustion space is obtained, whereby uniform heat distribution is obtained without cooler "pockets". The heating coils are preferably arranged outside the area of the opening, whereby the waste is prevented from falling down onto the heating coils during flushing.

The turning device in the bottom of the combustion space ensures that the falling bag is turned out and in and the waste is dispersed in the combustion chamber, which allows a shorter combustion time.

Due to the fact that opening/closing of the toilet takes place by means of motors, there is no risk of the combustion space closing up insufficiently, which can occur with pedal maneuvering.

These and other aspects of and advantages of the invention will be clear from a detailed description of a preferred embodiment and the subsequent patent claims.

BRIEF DESCRIPTION OF DRAWINGS

In the following description of a preferred embodiment, reference will be made to the enclosed drawings, of which

DESCRIPTION OF PREFERRED EMBODIMENT

Figure 1:
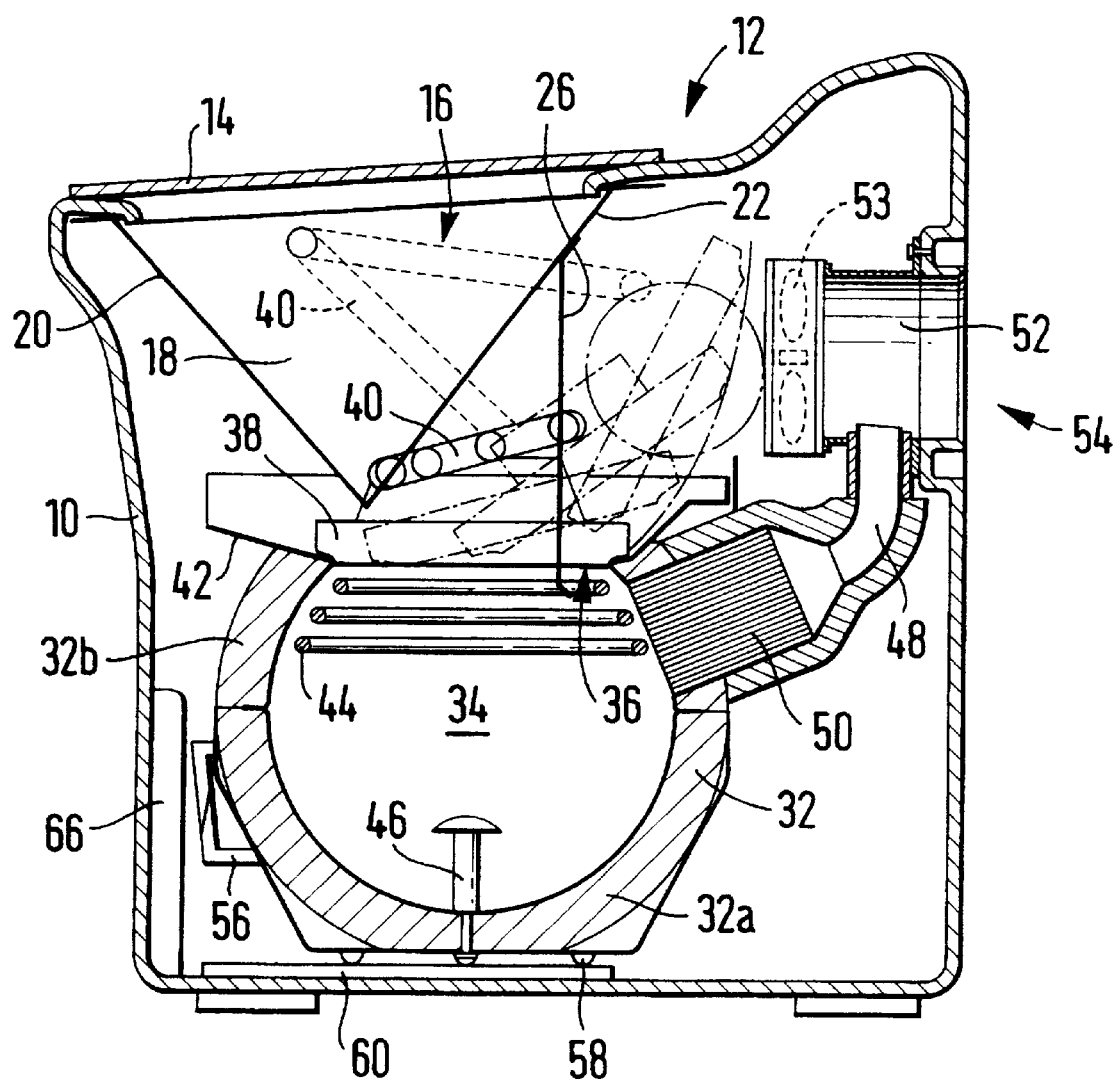
FIG. 1 shows a lateral view in section of an embodiment of an electric toilet according to the invention.
Figure 2:
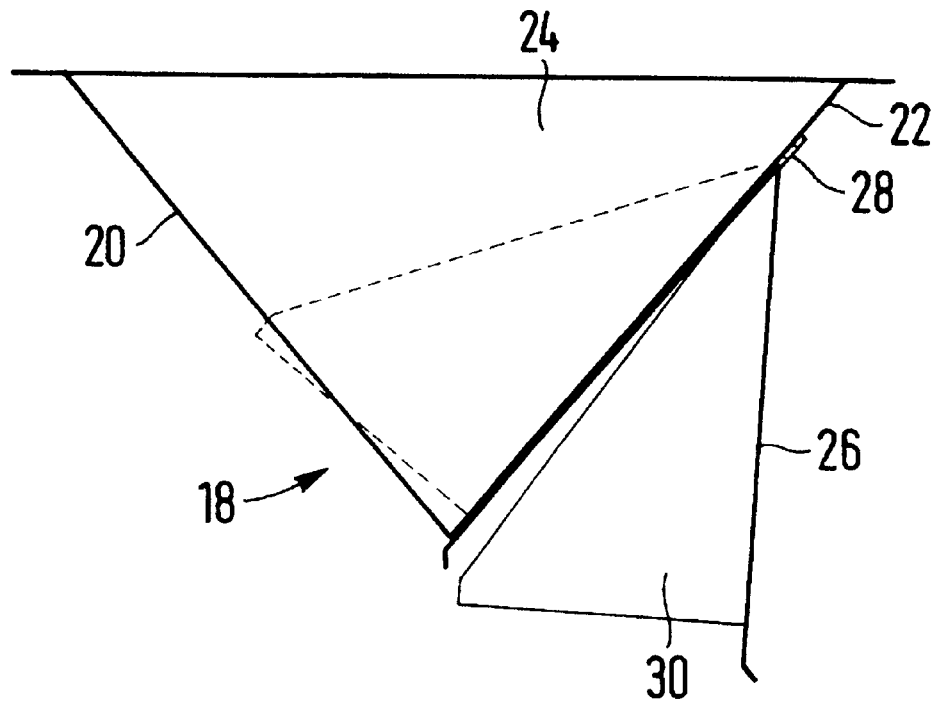
FIG. 2 shows a lateral view of an upper bowl forming part of the device according to FIG. 1.
Figure 3:
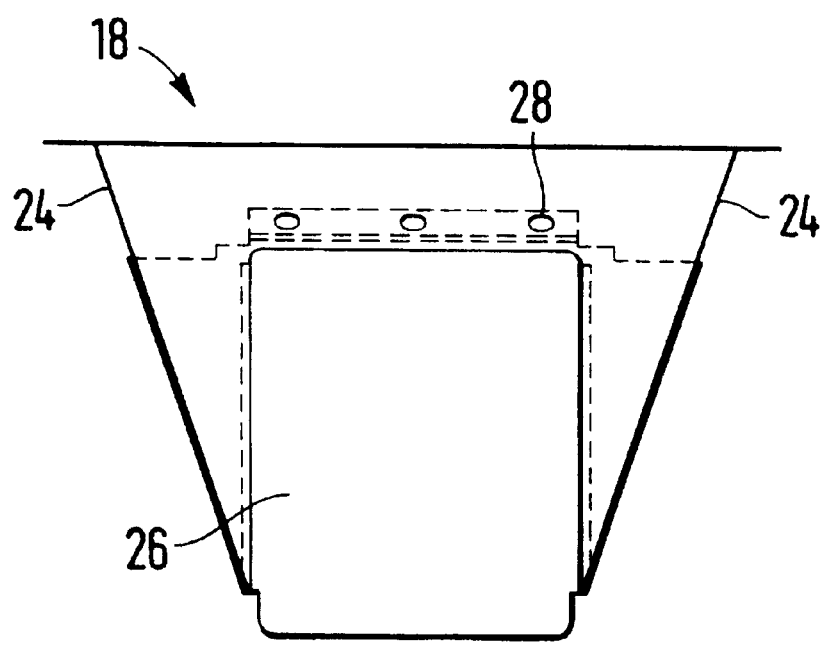
FIG. 3 shows the upper bowl according to FIG. 2 rotated by 90° and FIG. 4 shows a view from above of a bottom plate forming part of the device according to FIG. 1.

The device which is shown in the drawings comprises a cabinet or housing 10 of suitably heat-resistant and thermally insulating material. The cabinet is of a height which makes it comfortable to sit on. On the top side 12 of the cabinet and in the front edge a lid 14 is arranged articulately in its rear edge. Arranged under the lid 14 is an opening 16, the edge of which is gently rounded. Down in the opening a bowl 18, referred to henceforth as the upper bowl is affixed to the inside at the edges of the opening. The upper bowl 18 is formed with inwardly sloping front and back walls 20, 22, which meet along a line, and inwardly sloping side walls 24 so that the upper bowl has the appearance of a coffee filter funnel, FIGS. 2 and 3. The back wall 22 is arranged with a part 26 which is hinged rotatably around a bracket 28 a little way up on the back wall. The hinged part is also arranged with side walls 30 with the same inclination as the upper bowl's side walls.

Arranged under the upper bowl 18 is a combustion chamber 32. The combustion space 34 of the combustion chamber 32 has a principally spherical shape with a principally circular opening 36 towards the top. The combustion chamber 32 is located in relation to the upper bowl 18 so that the lower end of the upper bowl's front wall 20 is arranged above and by the front edge of the opening 36. The opening of the combustion chamber is provided with a lid 38 which closes the combustion chamber's combustion space by means of a sealing ring. A hinge arrangement 40 is affixed both to the hinged part 26 of the upper bowl 18 and to the lid 38 of the combustion chamber, which hinge arrangement 40 is actuated preferably by an electric motor (not shown).

Figure 4:
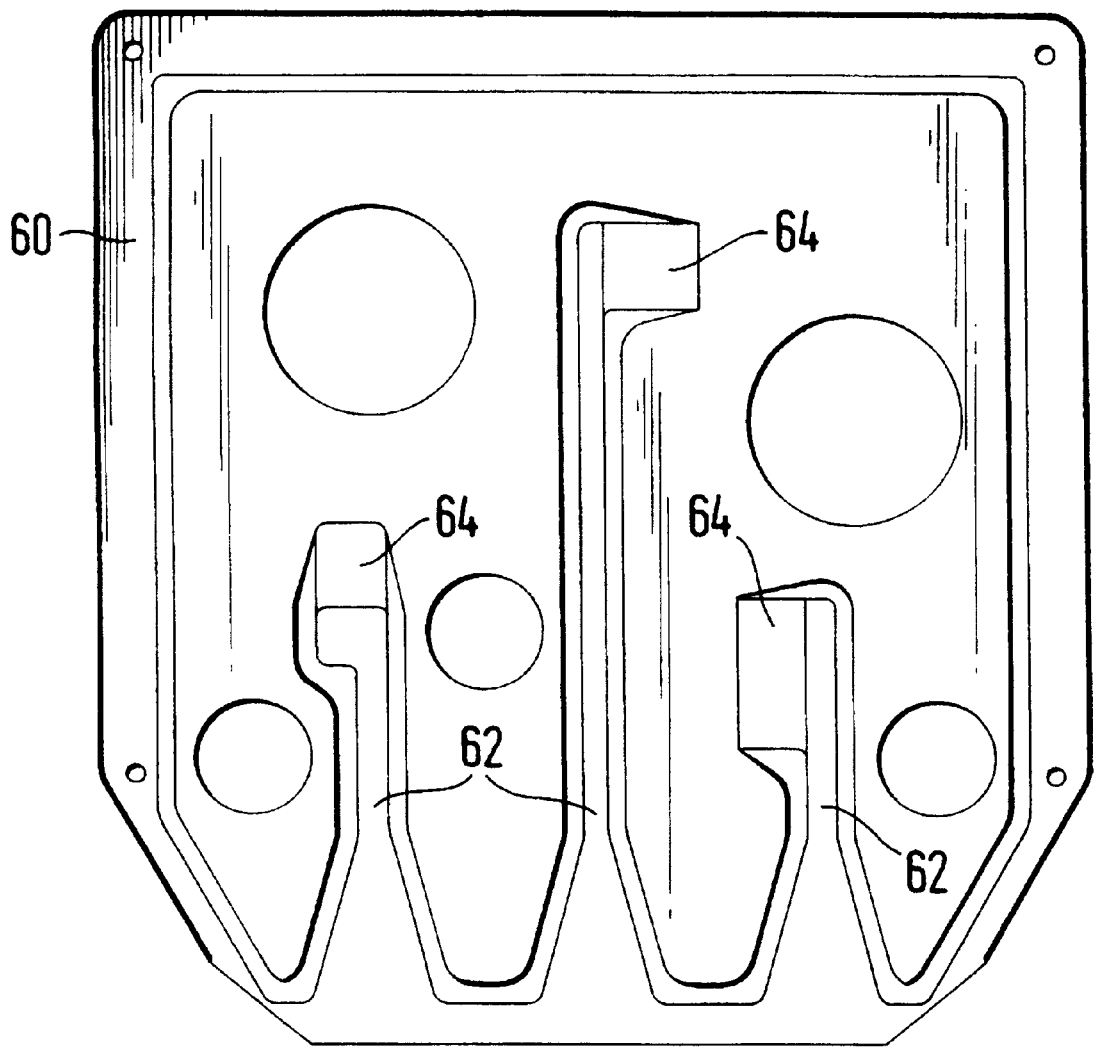

Arranged on the combustion chamber 32 and around its opening 36 is a spillage guard 42 in the form of a trough with lateral edges. In the upper part of the combustion space, heating coils 44 are arranged in a spiral round the periphery of the combustion space inside an area with the form of a spherical zone. Due to this design, the heat radiation is directed downwards towards the centre of the combustion space. The combustion space 34 is also arranged with a tuning device 46 in the form of a spike with an upwardly rounded disc on its top in the centre of the chamber's bottom. An evacuation pipe 48 is assigned to the combustion chamber. Affixed in the pipe nearest to the combustion space 34 is a catalyzer 50. The pipe 48 then continues to a suction fan 52 and on to an outlet 54 in the back of the cabinet. The outlet is then connected to a suitable ventilation pipe (not shown). The combustion chamber 32 is divided into a lower and an upper part, 32a and 32b respectively. The underside of the lower part 32a is provided on the one hand with a handle 56 in its front part and on the other hand with feet or beads 58, three in the embodiment shown. Arranged on the inside of the cabinet's bottom is a base plate 60 of a certain thickness. Arranged in the base plate are three grooves 62, FIG. 4, and ramps 64 from the grooves to the top side of the base plate. Arranged on the front side of the cabinet in its lower part is a door 66.

The device functions as follows. When the toilet has to be used, the protective lid 14 is raised. A bag of liquid-resistant paper with the same shape as the upper bowl 18 is placed into this. When one has relieved oneself, the protective lid 14 is closed. This activates the electric motor, which operates the rear part 26 in the upper bowl and the lid 38 of the combustion chamber 32 so that these open and swing out of the way respectively. The bag then drops down into the combustion space 34 and ends up on the turning device 46 in its bottom, whereupon the bag is turned out and in and the waste is dispersed in the combustion chamber. The rear part 26 and the lid 38 of the combustion chamber 32 are closed, at which the heating coils 44 are activated. The fan 52 for evacuation is activated. Under the influence of the heat from the heating coils 44, the faeces are now burnt, vaporized and/or gasified and the flue gases are conveyed up through the catalyzer 50, where they are purified of unpleasant odors. The flue gases are then conveyed into the fan 52. This takes its supply air from the inside of the cabinet and ensures air circulation therein. The fan rotor 53 which is arranged between the supply air intake in the fan housing and the flue gas inlet blows the flue gases out into the ventilation pipe. Due to this design, the flue gases do not pass through the fan rotor or coat this. Thanks to the design of the combustion chamber and its heating coils 44, heat radiation is obtained down towards the faeces and no "pockets" are obtained where the heat radiation reaches poorly.

When the toilet is to be emptied of ash, the door 66 in the front edge of the cabinet is opened. The handle 56 is then grasped and the whole of the lower part 32a of the combustion chamber turned, whereupon the feet 58 slide on the base plate 60 and down along the ramps 64 into the grooves 62. The under-part can then be pulled right out and emptied. Due to this design, a simple and functional solution is obtained for dividing and attaching the two halves of the combustion chamber without springs and similar arrangements.

The fan is preferably driven by a 12 V motor and the device is equipped with a back-up battery (not shown). This is for cases in which the power disappears before combustion is completely finished in the combustion chamber. It is then ensured that the fan continues to function and let out the odors from the hot waste, at least until it cools down.

The spillage guard 42 is arranged for those cases when a user urinates into the device without having placed any paper receptacle in the upper bowl. The urine then runs down from the upper bowl 18 to the spillage guard 42 and when the protective lid is closed the lid 38 for the combustion chamber is opened and the urine runs down into it. Compared with conventional electric toilets without spillage guards, it is considerably easier to clean the spillage guard of any urine remaining than the urine which in conventional toilets is allowed to run down everywhere in the interior of the toilet, with major cleaning problems as a result.

The combustion chamber can also be disposed with a pipe inlet. This is connected via pipes to a urinal arranged close to the device. When one has relieved oneself in the urinal, the liquid runs down into the combustion chamber and the urinal is rinsed using a smaller quantity of water to remove the odor, which water also runs down into the combustion chamber which burns/gasifies the liquid. With this addition a paper receptacle does not need to be placed into the upper bowl on urinating.

With an electric toilet according to the invention, a toilet is obtained which is considerably more functional than previous electric toilets and in which the disadvantages these exhibit are removed.

It must be understood that the invention is not restricted to the embodiment described above and shown in the drawings, but can be modified within the scope of the following patent claims.

I claim:

1. Electric toilet, comprising a cabinet (10), an opening (16) in the top side of the cabinet, a lid (14) provided in the opening (16), an upper bowl (18) arranged inside the opening, which bowl is openable downwards, a combustion chamber (32) arranged beneath the upper bowl (18) with a combustion space (34) and provided with an upper part having an opening (36) directed upwards, a lid (38) arranged in said combustion chamber opening, heating coils (44) arranged in the combustion space (34) and an evacuation device (48, 50, 52) connected to the combustion space (34), characterized in that the upper part of the combustion chamber (32) is formed principally with a spherical interior surface and that the heating coils (44) are arranged in the upper part of the combustion space (34) to diverge in a radial direction outside the circumference of the combustion chamber opening (36) along said interior surface, whereby, during use, waste falling through the combustion chamber opening is prevented from coming in contact with the heating coils.

2. Electric toilet according to claim 1, characterized in that the heating coils run around the upper part of the combustion space within an area which has the principal form of a spherical zone.

3. Electric toilet according to claim 1, characterized in that the bottom of the combustion space (34) is arranged with a turning device (46) directed upwards.

4. Electric toilet according to claim 1, characterized in that the evacuation device (48, 50, 52) is arranged with a catalyzer (50) for purifying the flue gases.

5. Electric toilet according to claim 1, characterized in that a trough (42) is arranged round the opening (36) of the combustion chamber (32).

6. Electric toilet according to claim 1, characterized in that the upper bowl (18) is formed with inwardly sloping front (20) and back walls (22) which meet along a line and side walls (24), in that the upper bowl (18) is positioned in relation to the opening (36) of the combustion chamber so that said line is in the front edge of the opening (36) and that the back wall (22) of the upper bowl (18) is hinged openably.

7. Electric toilet according to claim 1, characterized in that the evacuation device is arranged with a suction fan (52) and that this fan is driven by low direct-current voltage.

8. Electric toilet according to claim 7, characterized in that the suction fan takes supply air from the inside of the electric toilet and that the fan rotor (53) is not arranged in the path of the flue gases.

9. Electric toilet according to claim 1, characterized in that the heating coils (44) are located so that they do not come into contact with falling waste.

10. Electric toilet according to claim 1, characterized in that the opening of the upper bowl and the lid for the combustion chamber can only be activated when the protective lid is closed.

11. Electric toilet according to claim 10, characterized in that opening/closing of the upper bowl and the lid for the combustion chamber is effected by means of electric motors.

12. Electric toilet according to claim 1, characterized in that the combustion chamber (32) is arranged with an upper and a lower part (32*b*, 32*a*), that the lower part (32*a*) is arranged with feet or beads (58) on its underside, a base plate (60) arranged on the inside bottom of the cabinet, on which plate (60) the combustion chamber (32) stands with its beads (58) when the lower part (32*a*) is provided to the upper part (32*b*), which base plate is arranged with grooves (62) and ramps (64), in that when the lower part is to be dismantled, this is rotated, at which the beads slide down the ramps and down into the grooves and the under-part can be pulled away.

* * * * *

UNITED STATES PATENT AND TRADEMARK OFFICE
CERTIFICATE OF CORRECTION

PATENT NO. : 6,052,836
DATED : April 25, 2000
INVENTOR(S) : Pedersen

It is certified that error appears in the above-identified patent and that said Letters Patent is hereby corrected as shown below:

On the title page, in item "[73] Assignee:" please change the assignee from "Sirus Technology AS, Midsund, Norway" to -- Sirius Technology AS, Midsund, Norway --.

Signed and Sealed this

Twenty-second Day of May, 2001

Attest:

NICHOLAS P. GODICI

*Attesting Officer*  *Acting Director of the United States Patent and Trademark Office*